United States Patent
Mason et al.

(10) Patent No.: US 11,183,061 B2
(45) Date of Patent: Nov. 23, 2021

(54) PARKING MONITORING FOR WAIT TIME PREDICTION

(71) Applicant: Toyota Research Institute, Inc., Los Altos, CA (US)

(72) Inventors: Julian M. Mason, Redwood City, CA (US); Hiroshi Yasuda, San Francisco, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 547 days.

(21) Appl. No.: 15/883,744

(22) Filed: Jan. 30, 2018

(65) Prior Publication Data
US 2019/0236951 A1 Aug. 1, 2019

(51) Int. Cl.
| | | |
|---|---|---|
| *G08G 1/14* | (2006.01) | |
| *G08G 1/065* | (2006.01) | |
| *G06N 7/00* | (2006.01) | |
| *H04W 4/02* | (2018.01) | |
| *G01C 21/00* | (2006.01) | |
| *H04W 4/44* | (2018.01) | |
| *H04L 29/08* | (2006.01) | |

(52) U.S. Cl.
CPC ............. *G08G 1/143* (2013.01); *G01C 21/00* (2013.01); *G06N 7/005* (2013.01); *G08G 1/065* (2013.01); *H04W 4/027* (2013.01); *H04L 67/12* (2013.01); *H04W 4/02* (2013.01); *H04W 4/44* (2018.02)

(58) Field of Classification Search
CPC ........ G06N 7/005; G08G 1/065; G08G 1/143; G08G 1/0112; G08G 1/0133; G08G 1/146; H04W 4/44; H04W 4/02; H04W 4/027; G01C 21/00; G01C 21/3469; G01C 21/3492; H04L 67/12
See application file for complete search history.

(56) References Cited

U.S. PATENT DOCUMENTS

| | | | |
|---|---|---|---|
| 9,494,439 B1* | 11/2016 | Ross | G08G 1/161 |
| 2006/0082472 A1 | 4/2006 | Adachi et al. | |
| 2013/0265174 A1 | 10/2013 | Scofield et al. | |
| 2014/0046585 A1* | 2/2014 | Morris, IV | G01C 21/3415 |
| | | | 701/468 |

(Continued)

FOREIGN PATENT DOCUMENTS

| | | |
|---|---|---|
| JP | H0757188 A | 3/1995 |
| JP | H10275299 A | 10/1998 |
| NL | 2008517 C | 9/2013 |

OTHER PUBLICATIONS

L. Mannini, et al., "On-Street Parking Search Time Estimation Using FCD Data," Transportation Research Procedia 27 pp. 929-936 (Year: 2017).*

*Primary Examiner* — Rehana Perveen
*Assistant Examiner* — Steven W Crabb
(74) *Attorney, Agent, or Firm* — Christopher G. Darrow; Darrow Mustafa PC

(57) ABSTRACT

Systems and methods for predicting wait time in a parking area are disclosed herein. The systems and methods include determining how long a sensing vehicle has been within a parking area without parking. Using this information, the method determines the estimated wait time for the parking area and transmits guidance to one or more recipient vehicles. This helps with efficient selection of parking areas, saving gas and preventing congestion on roadways.

20 Claims, 7 Drawing Sheets

(56) References Cited

U.S. PATENT DOCUMENTS

| | | |
|---|---|---|
| 2014/0266800 A1 | 9/2014 | Koukoumidis et al. |
| 2014/0278071 A1 | 9/2014 | San Filippo et al. |
| 2015/0338226 A1 | 11/2015 | Mason et al. |
| 2016/0025503 A1* | 1/2016 | Kees ................. G08G 1/143 |
| | | 701/400 |
| 2016/0180712 A1* | 6/2016 | Rosen ............ G01C 21/3685 |
| | | 705/5 |
| 2017/0148324 A1* | 5/2017 | High ................. G08G 1/143 |
| 2017/0178172 A1 | 6/2017 | Balasubramanian et al. |
| 2018/0336784 A1* | 11/2018 | Liu ............... G08G 1/096866 |
| 2018/0373268 A1* | 12/2018 | Antunes Marques Esteves ......... |
| | | B60L 53/00 |

* cited by examiner

PARKING MONITORING FOR WAIT TIME PREDICTION

TECHNICAL FIELD

Embodiments described herein generally relate to prediction of parking area wait time. More specifically, embodiments generally relate to vehicle idle information in a parking area.

BACKGROUND

Drivers, upon reaching their destination, will need to park and leave the vehicle. Thus, it is commonly understood that vehicles will be parked in a parking location, such as a on the side of the street or in a parking lot, upon arrival. However, determining the position and timing of available parking spots is difficult. Current manual parking relies on guesswork by the driver, having the driver get to know the surroundings and determine the positions where a parking spot is likely to be found. This technique can be both time consuming and unreliable. Though, it is common for drivers to drive around from parking lot to parking lot, there has been some interest in automatically determining if a parking spot is empty. However, the current technology cannot estimate parking availability at any particular parking area.

SUMMARY

The systems and methods described herein describe the use of idle time to determine the wait time for parking in a parking area. In one embodiment, a parking interval system for predicting wait time is described. The parking interval system can include one or more processors, and a memory communicably coupled to the one or more processors. The memory can store a proximity module including instructions that when executed by the one or more processors cause the one or more processors to receive operator activity information from one or more sensing vehicles in one or more parking areas, the operator activity information including changes in movement or position within the one or more parking areas while the one or more sensing vehicles are active. The memory can further store an activity monitoring module including instructions that when executed by the one or more processors cause the one or more processors to determine, using the operator activity information, idle information for the one or more sensing vehicles in the one or more parking areas. The memory can further store an estimation module including instructions that when executed by the one or more processors cause the one or more processors to determine, using the idle information, an estimated wait time for a parking space in the one or more parking areas, and to transmit, through a communication device to a recipient vehicle, guidance including the estimated wait time for the one or more parking areas.

In another embodiment, a non-transitory computer-readable medium for predicting wait time is disclosed. The non-transitory computer-readable medium can store instructions that when executed by one or more processors cause the one or more processors to receive operator activity information from one or more sensing vehicles in one or more parking areas, the operator activity information including changes in movement or position within the one or more parking areas while the one or more sensing vehicles are active. The non-transitory computer-readable medium can further store instructions to determine, using the operator activity information, idle information for the one or more sensing vehicles in the one or more parking areas. The non-transitory computer-readable medium can further store instructions to determine, using the idle information, an estimated wait time for a parking space in the one or more parking areas. The non-transitory computer-readable medium can further store instructions to transmit, through a communication device to a recipient vehicle, guidance including the estimated wait time for the one or more parking areas.

In another embodiment, a method for predicting wait time is disclosed. The method can include receiving operator activity information from one or more sensing vehicles in one or more parking areas, the operator activity information including changes in movement or position within the one or more parking areas while the one or more sensing vehicles are active. The method can further include determining, using the operator activity information, idle information for the one or more sensing vehicles in the one or more parking areas. The method can further include determining, using the idle information, an estimated wait time for a parking space in the one or more parking areas. The method can further include transmitting, through a communication device to a recipient vehicle, guidance including the estimated wait time for the one or more parking areas.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Figure 1:
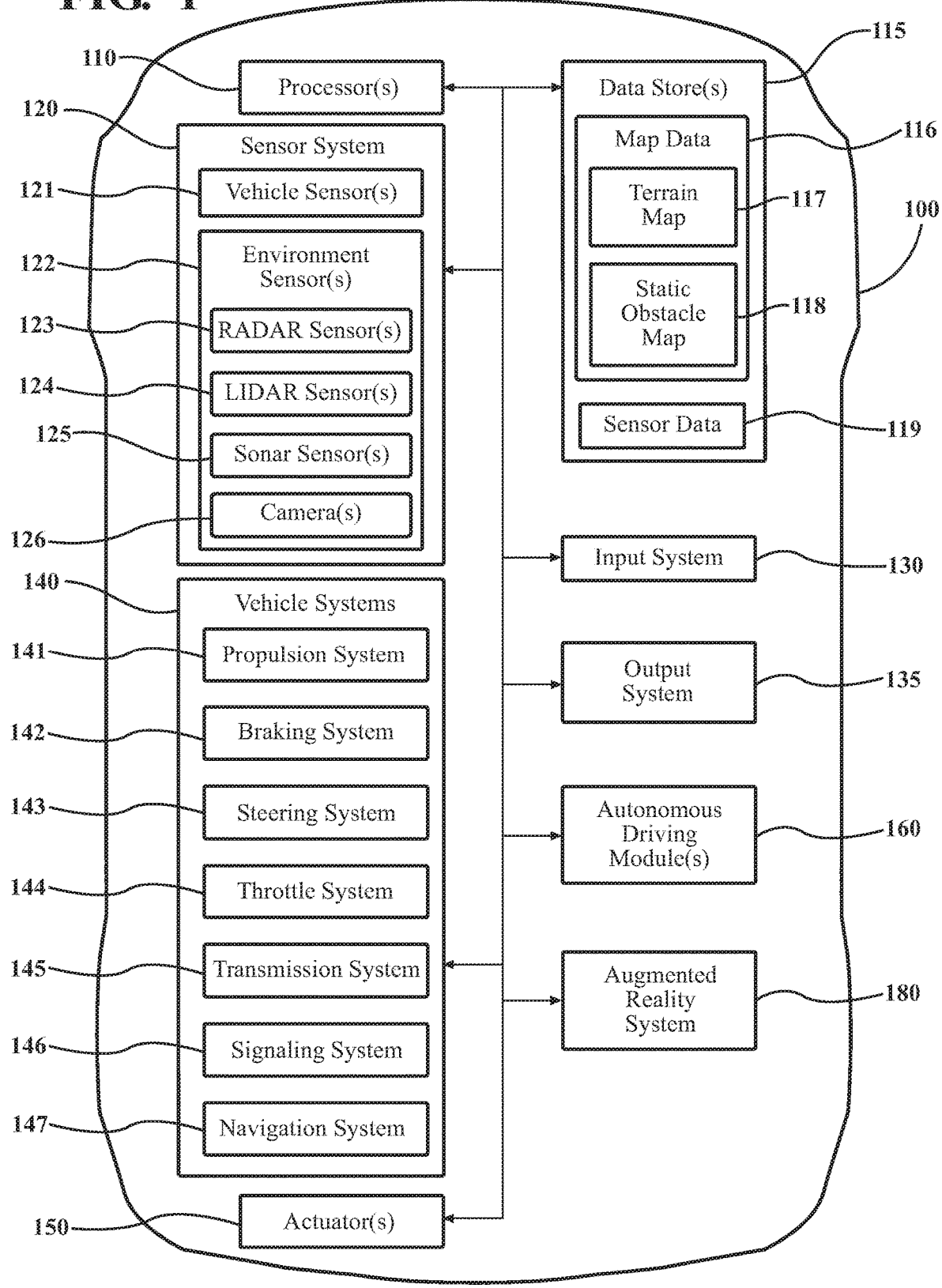
FIG. 1 is a block diagram of a vehicle useable as part of a parking interval system, according to embodiments described herein

Although parking space information is valuable, it is often imprecise for the purposes of determining when parking spaces will come available generally. In the present application, the systems and methods described herein can estimate how long it will take to park, rather than focusing on whether or not a given parking space is occupied. In one or more embodiments, the idle information is determined by using location traces. Location traces are determined by watching how long vehicles wait or circle in a parking lot. Using location traces, we can measure, statistically, how long it will take a vehicle to park there. In further embodiments, the system and methods can include tracking of vehicles leaving the parking lot, and predict how long vehicles usually stay parked for a given parking lot.

Embodiments described herein can incorporate vehicle-to-cloud (V2C) communication. The vehicles can use indications of vehicle mobility ("operator activity information"), such as vehicle on-board GPS information and/or ignition ON sensors, to indicate how long a vehicle has been driving around a parking area. The operator activity information can then be uploaded to the cloud for further use or processing. This operator activity information can be used to determine the general availability of parking spaces or the likelihood that a vehicle will park in a parking area. In one embodiment, the average time for such vehicles to find a parking spot and turn off the ignition can be used to estimate how long it will take an average driver to locate an available parking space for a given parking lot.

Further, the operator activity information can be collected cumulatively, such that further data regarding the parking area can be elucidated from the operator activity information. As information is collected over time, such as over different times of the day, week, and year, a probabilistic model can be formed. The probabilistic model can be used to map out relevant data about the parking area, such as the average wait time and the likelihood that a parking area is busy, based on the historic data.

The operator activity information can be updated over time, improving the model of idle information for various parking areas. Embodiments described herein can use a planning algorithm with a variety of vehicle types, including autonomous vehicles, semi-autonomous or non-autonomous vehicles, to collect, process and transmit the operator activity information and relevant data or transformations of said data. A remote operator can then use the information or data to select a parking area. Fully autonomous vehicles can also collect operator activity information or related data regarding a parking area, such as a parking lot, during transit to or from some other destination. This information will allow a driver or autonomous vehicle to drive to the closest parking lot with the shortest wait time. Embodiments of the present application can be more clearly understood with relation to the figures and the description below.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate autonomously, semi-autonomously, or manually by an in-vehicle operator. The vehicle 100 can include a parking interval system or capabilities to support a parking interval system, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In embodiments described herein, the vehicle 100 is in communication with a computing device 200. The vehicle 100 being in communication with the computing device 200 refers to any forms of direct or indirect communication between the computing device 200 and the vehicle 100, including direct communication, communication through one or more intermediary computing devices, communication through the cloud, or combinations thereof. The communication can be performed through the use of a variety of wired or wireless networks In some embodiments, the computing device 200 is a server which is remote from the vehicle 100. In further embodiments, the computing device 200 can be integrated into the vehicle 100, such as an embedded system. The computing device 200 can include a parking interval system 270 that is implemented to perform methods and other functions as disclosed herein.

Figure 2:
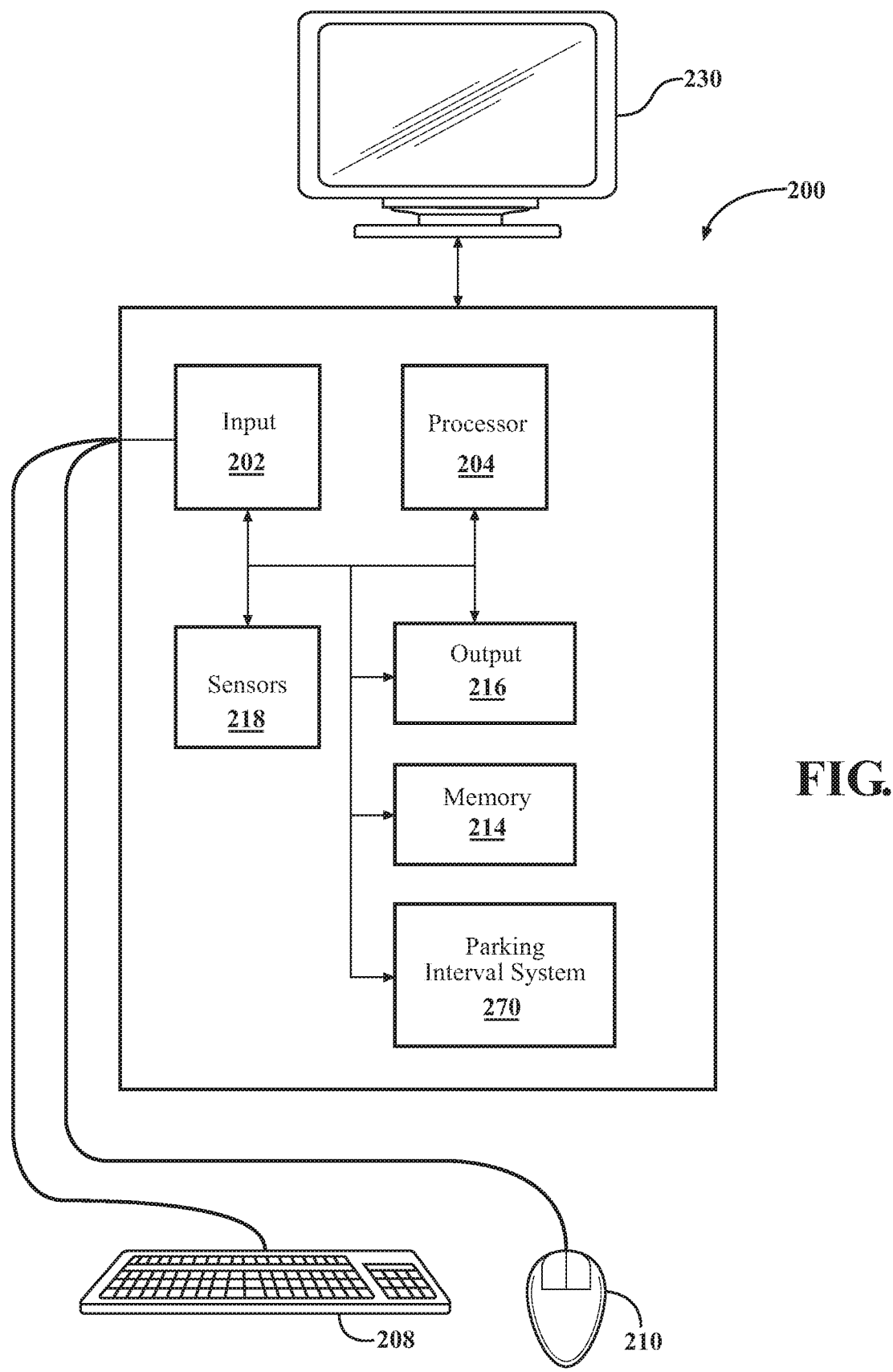
FIG. 2 is a block diagram of a computing device incorporating a parking interval system, according to embodiments described herein

Referring to FIG. 2, an example of a computing device 200 having the parking interval system 270 in communication with the vehicle 100 is illustrated. The computing device 200 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application specific integrated circuit). Shown here, the computing device 200 is a server connected with a display device 230. While arrangements will be described herein with respect to PC computers, it will be understood that embodiments are not limited to PC computers. In some implementations, the computing device 200 can be any other form of computing device that, for example, can operate at least semi-autonomously, receive data transmissions from one or more vehicles, send data transmissions to one or more vehicles, and can benefits from the functionality discussed herein.

The computing device 200 can have an input 202 for obtaining images for analysis and final identification and/or verification. The input 202 is one or more connections, either wired or wireless, for an input device to the computing device 200. The input 202 can be any suitable communication interface depending on device type and include, but is not limited to, USB (universal serial bus), frame grabber, Ethernet, or Firewire. The computing device 200 further comprises a processor 204, such as a general purpose processor, for use in the data processing and analysis described herein. In some embodiments, the input 202 be connected with sensors 218 (e.g., the sensor system 120 of the vehicle 100), microphones or other active or passive input devices or systems. Shown here, the input 202 is connected with a keyboard 208 and a mouse 210. In further embodiments, the computing device 200 can include a connection 212. The connection 212, which can be wired or wireless, can allow the computing device 200 to communicate with other computing devices, locally or remotely, such as over a network protocol (e.g., Ethernet or similar protocols). The connection 212 can further be connected with remote devices associated with other computing devices, such as the sensors system 120 and the data store 115 as described with reference to the vehicle 100.

The computing device 200 can further comprise some volatile or non-volatile memory, such as memory 214. The memory 214 can include one or more modules that include computer readable instructions that, when executed by the processor 204, cause the processor 204 to perform methods and functions that are discussed herein. The memory 214 can include a database 310, described with reference to FIG. 3. The memory 214 can contain information related to a reference material for comparison and/or analysis purposes. The computing device 200 can also include output connection 216 for conveying output in a fashion which is usable by the vehicle 100 or a user. In one example, the output connection 216 conveys output to a screen for convenient viewing (e.g., display device 230) or to a control device, such as a control device produced using the augmented reality (AR) system 180 for controlling the vehicle 100.

The computing device 200 further includes the parking interval system 270 that is implemented to perform methods and other functions as disclosed herein relating to determination of vehicle idle information and parking area availability. The parking interval system 270 includes a plurality of modules to perform the functions described herein, including a proximity module 320, an activity monitoring module 330 and an estimation module 340. In one or more embodiments, the parking interval system 170 can communicate via a wired or wireless connection with the vehicle 100 to correlate functionality as discussed herein. The parking interval system can be in communication with one or more vehicles to collect information about the parking area. In one embodiment, the vehicle 100 is representative of the one or more vehicles, as used herein.

Figure 3:
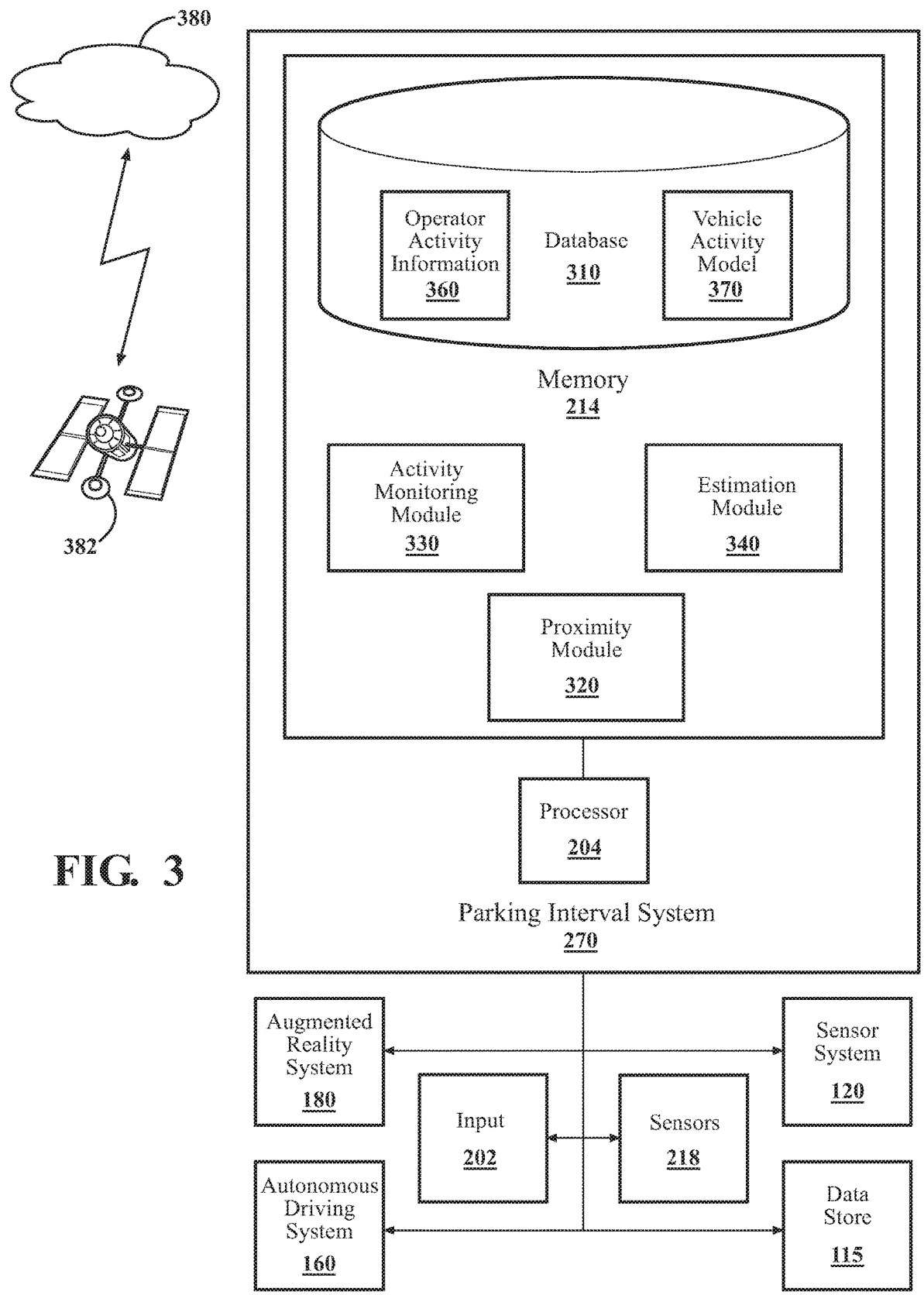
FIG. 3 is an illustration of a parking interval system for predicting wait time, according to embodiments described herein

The parking interval system 270 is more clearly described with reference to FIG. 3. The parking interval system 270 is shown as including a processor 204 from the computing device 200, depicted in FIGS. 1 and 2. Accordingly, the processor 204 can be a part of the parking interval system 270, the parking interval system 270 can include a separate processor from the processor 204 of the computing device 200, the processor 110 of the vehicle 100, or the parking interval system 270 can access the processor 204 through a data bus or another communication path. In one embodiment, the parking interval system 270 includes the memory 214 that stores a proximity module 320, an activity monitoring module 330 and an estimation module 340. The memory 214 is a random-access memory (RAM), read-only memory (ROM), a hard-disk drive, a flash memory, or other suitable memory for storing the modules 320, 330, and 340. The modules 320, 330, and 340 are, for example, computer-readable instructions that when executed by the processor 204, cause the processor 204 to perform the various functions disclosed herein.

The proximity module 320 generally includes instructions that function to control the processor 204 to detect one or more sensing vehicles in the boundaries of the plurality of parking areas and to receive operator activity information 360 from the one or more sensing vehicles. The proximity module 320 can determine the number of sensing vehicles in the parking area using a network 380. The network 380 is a connection between the computing device 200 and the sensing vehicles which allows for the transmission of information, as used by the parking interval system 270. The parking area is an area dedicated to or appropriate for the parking and/or storage of vehicles. Parking areas, as used herein, can include open fields, parking lots, parking structures, underground parking structures, multi-use parking locations, temporary parking locations, and others. The sensing vehicles can be any vehicle capable of collecting information regarding the operator activity of the sensing vehicle. In one embodiment, the one or more sensing vehicles are substantially similar to the vehicle 100 described with reference to FIG. 1.

It should be understood that sensing vehicles and recipient vehicles, as used herein, is descriptive of performing the sensing vehicle and receiving vehicle functions. Unless expressly stated to the contrary, this distinction between the vehicle functions is not intended to limit the possible embodiments of the sensing vehicles or recipient vehicles. Sensing vehicles and recipient vehicles can overlap in capability or be the same vehicle. In one or more examples, the sensing vehicles can have one or more systems and capabilities of a recipient vehicle. As well, in one or more embodiments, the recipient vehicles can have one or more devices, systems and capabilities of the sensing vehicles. In one example, the vehicle 100 is a sensing vehicle when performing the sensing functions described herein and a recipient vehicle when performing the recipient vehicle functions described herein.

The operator activity information 360 can indicate aspects about the activity of the operator of the sensing vehicle and the idle status of the sensing vehicle, such as the ignition state of the vehicle, the movement in the steering wheel, depression of one or more pedals, physical movement of the vehicle, or other indicators that the vehicle is not parked in a parking spot. The operator, for the purposes of the operator activity information 360, can be either an autonomous control system in an autonomous sensing vehicle, a person and/or the autonomous control system in the case of a semi-autonomous sensing vehicles, or the person alone in the case of a manual sensing vehicle. The operator activity information 360 can include the parking status of the one or more sensing vehicles collected over a period of time. In one or more embodiments, the operator activity information 360 can be stored, in part or in whole, as part of a data store in the vehicle, such as the data store 155 of the vehicle 100. The proximity module 320 can use the network 380 to access the data store 115 and retrieve the operator activity information 360 for further use, as described herein.

The activity monitoring module 330 can further include instructions that function to control the processor 204 to then determine, using the operator activity information 360, the idle information for the one or more sensing vehicles in the one or more parking areas. The idle information includes the period of time that the sensing vehicle spends in a parking area without being parked. The idle information can include changes in movement or position within the parking area while the one or more sensing vehicles are active and not parked. In one or more embodiments, the idle information can include movement around the parking area, standing in the parking area, waiting time for entry into a parking area, waiting time for exiting the parking area, in the case of failure to park, and others. The operator activity information 360, as described above, contains a number of entries regarding the movement of the sensing vehicle, such as ignition on information, vehicle movement information, transmission status information and other indicia of the sensing vehicle idling outside of a parking space. As such, the activity monitoring module 330 determines the idle status of the vehicle, the amount of time the vehicle has been idle, the number of idle sensing vehicles in the parking area.

The activity monitoring module 330 can, using the network 380, access the vehicle activity model 370 to determine the idle information for the sensing vehicles. There are circumstances where the sensing vehicles are not parked while in a parking area intentionally. Further, there are circumstances where the sensing vehicles are parked but maintain an idle status (e.g., waiting for a second person, preparation for a meeting or event, etc.). The vehicle activity model 370 collects information to characterize the difference between each status, to differentiate between a sensing vehicle which is idle and waiting on a parking spot and a sensing vehicle which is idle and not attempting to park or already parked. The vehicle activity model 370 can use received information from the vehicle sensors, either locally or remotely, to determine changes in the position of the steering wheel, imaging related to the position of the operator, position of other sensing vehicles in the parking area, entry time, previous behaviors of a sensing vehicle in a parking area and others to determine the general intent of the operator in the parking area.

The estimation module 340 can further include instructions that function to control the processor 204 to determine, using the idle information, the estimated wait time for a parking space in the parking area. The estimated wait time is the period of time that an operator can expect to wait for a parking spot in a specific parking area. Specifically, the estimation module 340 can use idle information collected from a plurality of sensing vehicles, located in a plurality of parking areas to generate a probability map of the parking areas in the working region of the computing device 200. The probability map can be a map indicating the relative distance of the plurality of parking areas and the attached likelihood of parking, based on the estimated wait time. The estimated wait time can be specific to time frames, such as specific intervals over the course of a day, days of the week, weeks or months of the year, holidays, events, combinations thereof or others.

The estimation module 340 can then transmit guidance, through a communication device, to a recipient vehicle, including a selection of parking areas from the plurality of parking areas. The guidance can be transmitted via the network 380. In one embodiment, the selection of parking areas can be based on the estimated wait time. The selection of parking areas can further include relative distance, traffic obstacles and other traffic related information for each of the selection of parking areas. The recipient vehicle is a vehicle configured to receive input from the parking interval system 270. In one embodiment, the recipient vehicle is substantially similar to the vehicle 100, described with reference to FIG. 1. The selection of parking areas can then be transmitted to the recipient vehicle. The selection of parking areas can be presented through a communication device in the recipient vehicle. The communication device can be any device capable of allowing the system to communicate with either an operator or an autonomous vehicle. In one embodiment, the communication device is a display located in the recipient vehicle. In another embodiment, the recipient vehicle includes an AR system 180, described with reference to FIG. 1. In this embodiment, the parking interval system 270 transmits the guidance, including the selection of parking areas, to a display which is visualized on the windshield of the recipient vehicle. In a further embodiment, the communication device is an audio device which verbally communicates with the operator regarding the selection of parking areas.

The operator of the recipient vehicle can then perform one or more actions with relation to the guidance from the estimation module 340. In one embodiment, the operator can use the guidance to manually select a parking areas from the selection of parking areas. The manual selection can include either input regarding the selection or manually driving to the selected parking area. The manual selection can include either manual control, semi-autonomous control or autonomous control of the vehicle with relation to the selected parking area. In another embodiment, the selected parking area can be chosen automatically based on one or more criteria from the operator, such as distance from the parking area, a maximum estimated wait time, a wait time which results in parking at a specific selected time, number of other recipient vehicles which are in transit to the same parking are, or others. The estimation module 340 can further provide instructions to the recipient vehicle for travel to the selected parking area. The instructions can rely on autonomous systems of the recipient vehicle, such as the autonomous driving module 160 of the vehicle 100.

Through the parking interval system 270, described herein, the recipient vehicle can achieve numerous benefits. The recipient vehicle can spend less time waiting for a parking space by choosing a parking area with a lower estimated wait time. Thus, the recipient vehicle will use less fuel while waiting in the parking area. Further, this will reduce traffic congestion in high traffic areas, as recipient vehicles are being diverted to lower traffic areas. Finally, the parking interval system 270, described above, can reduce the overall stress of drivers, reducing angry driving and the dangers inherent therein.

Figure 4A:
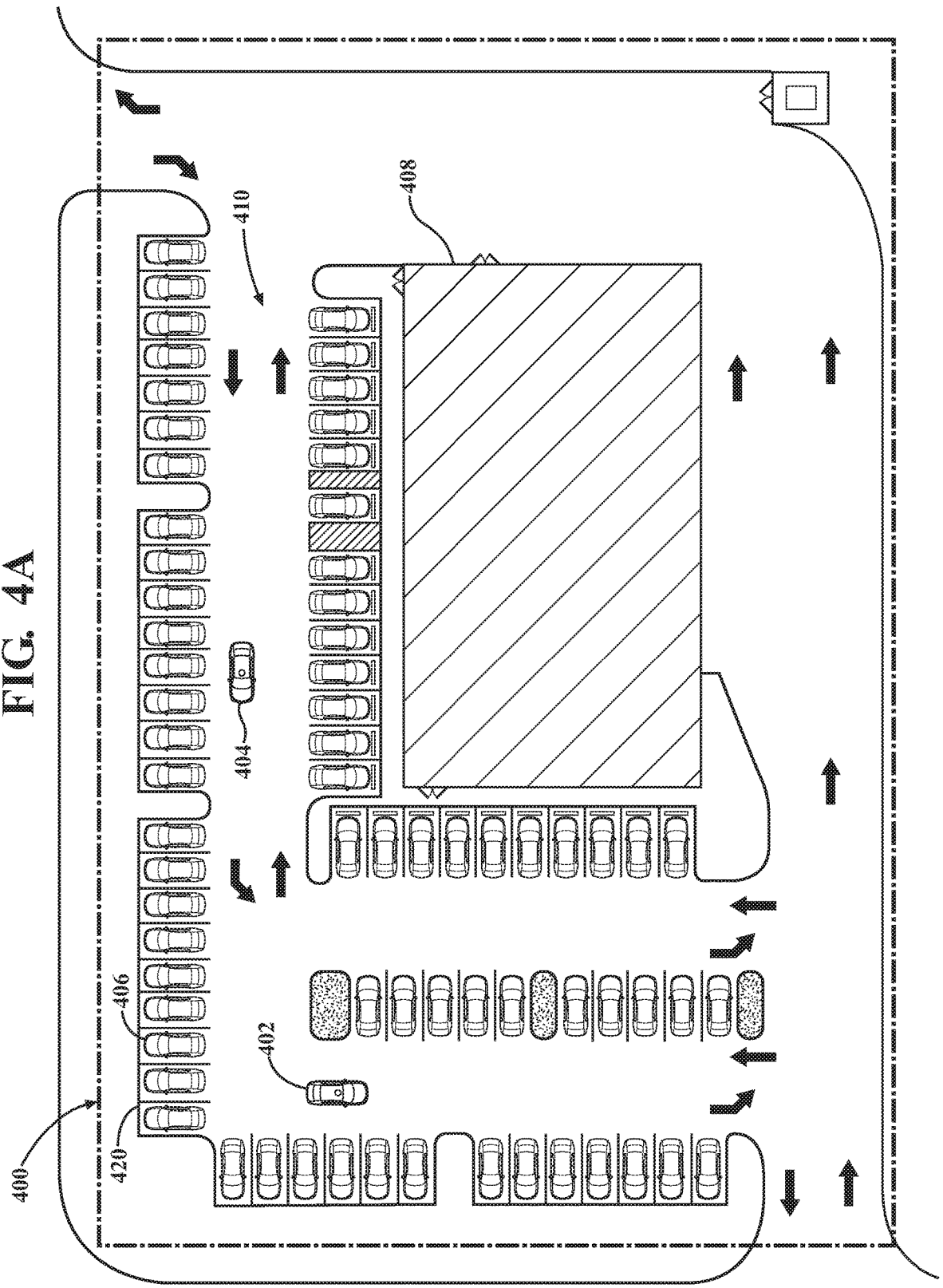
FIGS. 4A-4B depict a parking area with an aerial view of one or more sensing vehicle using the parking interval system, according to one or more embodiments.
Figure 4B:
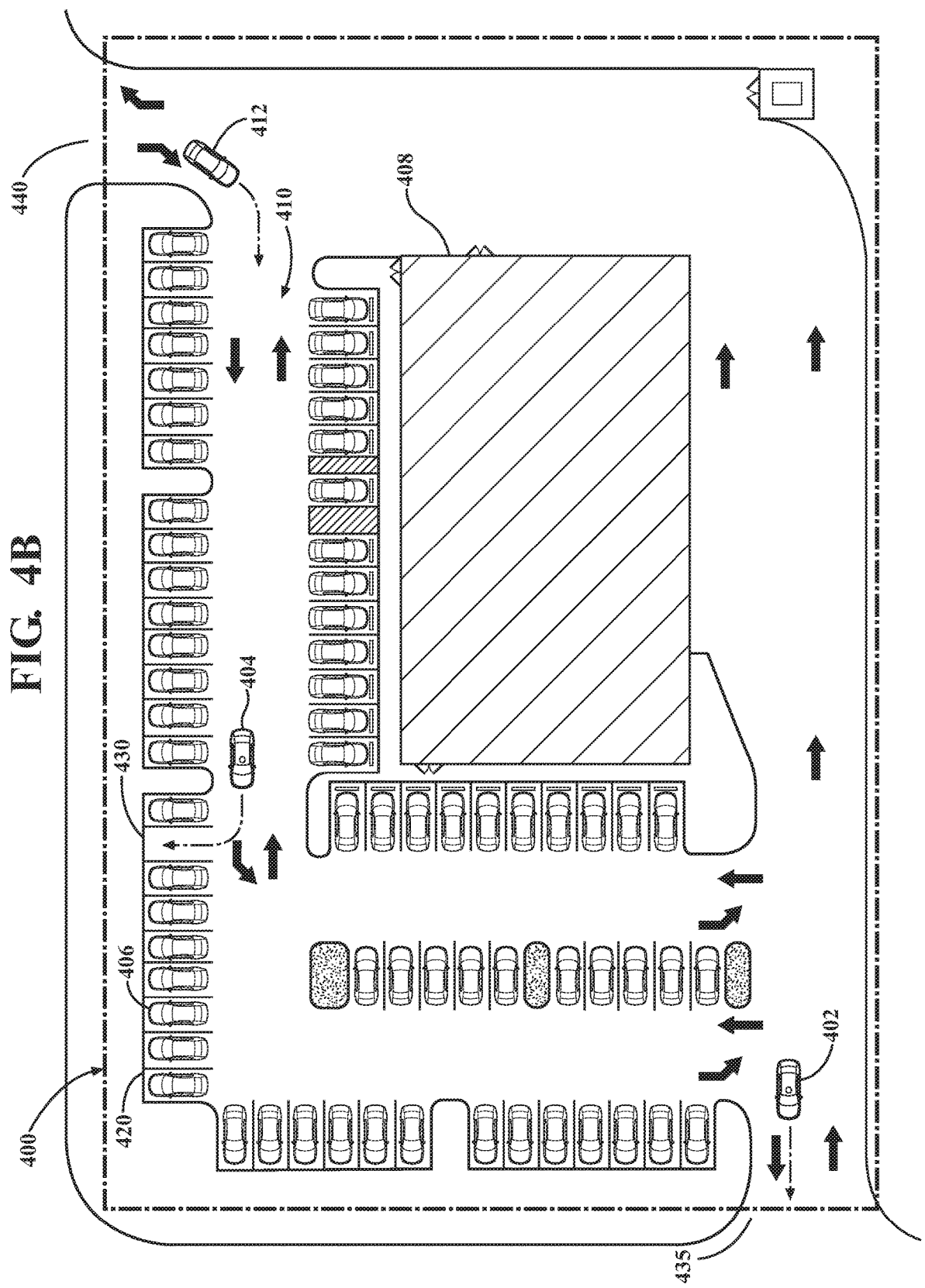

FIG. 4A-4B depict a parking area 400 with an aerial view of one or more sensing vehicles using the parking interval system 270, according to one or more embodiments. FIG. 4A depicts the parking area 400 having a plurality of parking spaces 420. The parking spaces 420 can have a plurality of parked vehicles 406. The parking spaces 420 can general parking spaces or they can be for utilization by a specific structure, such as building 408. The parked vehicles 406 can be idling in the one of the parking spaces 420 or otherwise in a parked position. Shown here, the parking spaces 420 are fully occupied by parked vehicles 406, indicating that the parking area 400 is at capacity.

One or more sensing vehicles, shown here as a first sensing vehicle 402 and a second sensing vehicle 404, can be in the parking area 400. The sensing vehicles 402 and 404 can be positioned in the movement area 410 of the parking area 400. The movement area 410 is the region of the parking area which is designated for the ingress and egress of vehicles through the parking area 400. As described above, the sensing vehicles 402 and 404 can be any vehicles capable of providing indicators of vehicle ignition and movement to the computing device 200. In one example, the first sensing vehicle 402 is an autonomous vehicle with the systems described with reference to the vehicle 100 of FIG. 1. In another example, the second sensing vehicle 404 is a manual vehicle having one or more systems capable of determining the ignition state and other movement related factors of the second sensing vehicle 404. The sensing vehicles 402 and 404 can move independently of one another or based on vehicle-to-vehicle communication.

Shown here, the first sensing vehicles 402 and second sensing vehicle 404 are waiting for one of the parking spaces 420 in the parking area 400. The first sensing vehicle 402 is waiting in a first position in the movement area 410 and the second sensing vehicle 404 is waiting in a second position in the movement area 410. The sensing vehicles 402 and 404 can be detected remotely by the computing device 200 using the parking interval system 270. The parking interval system 270 can use the proximity module 320 to determine that the sensing vehicles 402 and 404 are in the parking area 400. Once determined to be within the parking area 400, the proximity module 320 can then request, or receive unprompted, operator activity information 360 from the sensing vehicles 402 and 404. The sensing vehicles 402 and 404 can then upload operator activity information 360 using one or more sensors. In one embodiment, the operator activity information 360 can include information regarding operation and movement of the first sensing vehicle 402 and the second sensing vehicle 404. The operator activity information 360 can include one or more of the ignition state, steering wheel movement, pedal position, transmission state, vehicle position in a movement area, wheel movement (either directional or rotational movement), operator status, conversational data (e.g., verbal indicators that the sensing vehicle is not parked), or other information. The operator activity information 360 can be different information from different sensors, between each of the sensing vehicles.

FIG. 4B depicts further changes in the parking area 400, as related to the first sensing vehicle 402 and the second sensing vehicle 404. FIG. 4B is intended to represent a period of time after FIG. 4A in the same parking area 400. The first sensing vehicle 402 has decided to exit the parking area 400, though a first entrance/exit location 435. During this time, an unoccupied parking space 430 has opened up. The second sensing vehicle 404 moves into the unoccupied parking space 430. As well, a third sensing vehicle 412 enters the parking area 400 and the movement area 410, through an entrance 440. The proximity module 320 then receives further operator activity information 360 indicating that the first sensing vehicle 402 has exited the parking area, and that the second sensing vehicle 404 has parked in the unoccupied parking space 430. The proximity module 320 then further detects that the third sensing vehicle 412 has entered the parking area 400 and requests operator activity information 360 as described above.

The activity monitoring module 330 of the parking interval system 270, then determines idle information for the sensing vehicles 402 and 404. The idle information is a determination of the parking status of the sensing vehicle within the parking area 400. The idle information can be determined based on the operator activity information 360 during the time that the sensing vehicle ignition was on and/or the sensing vehicle was in the parking area 400. To determine the idle information, the activity monitoring module 330 applies the operator activity information 360 to the vehicle activity model 370. As described above, the vehicle activity model 370 provides guidance as to an idle determination, using the collected operator activity information 360 in the context of the parking area 400. The activity monitoring module 330 using the vehicle activity model 370, determines idle information about the first sensing vehicle 402, including that the first sensing vehicle 402 was idle for a first period of time and left the parking area 400 without successfully parking. The activity monitoring module 330, using the vehicle activity model 370, further determines idle information about the second sensing vehicle 404, including that the second sensing vehicle 404 was idle for a second period of time and successfully parked in the unoccupied parking space 430.

In one or more embodiments, the activity monitoring module 330 can further detect idle information on a continuous basis. In this embodiment, the third sensing vehicle 412 can be determined to be idle or not, based on an ongoing collection of operator activity information 360. The time intervals for collection and determination can vary based on the desires of the parking interval system 270 or one or more users of the parking interval system 270. Time intervals can include updating the operator activity information 360 every second, every minute, every hour, or any time frame in between (e.g., such as, in cases where the information is collected and stored locally in the sensing vehicle).

Figure 5:
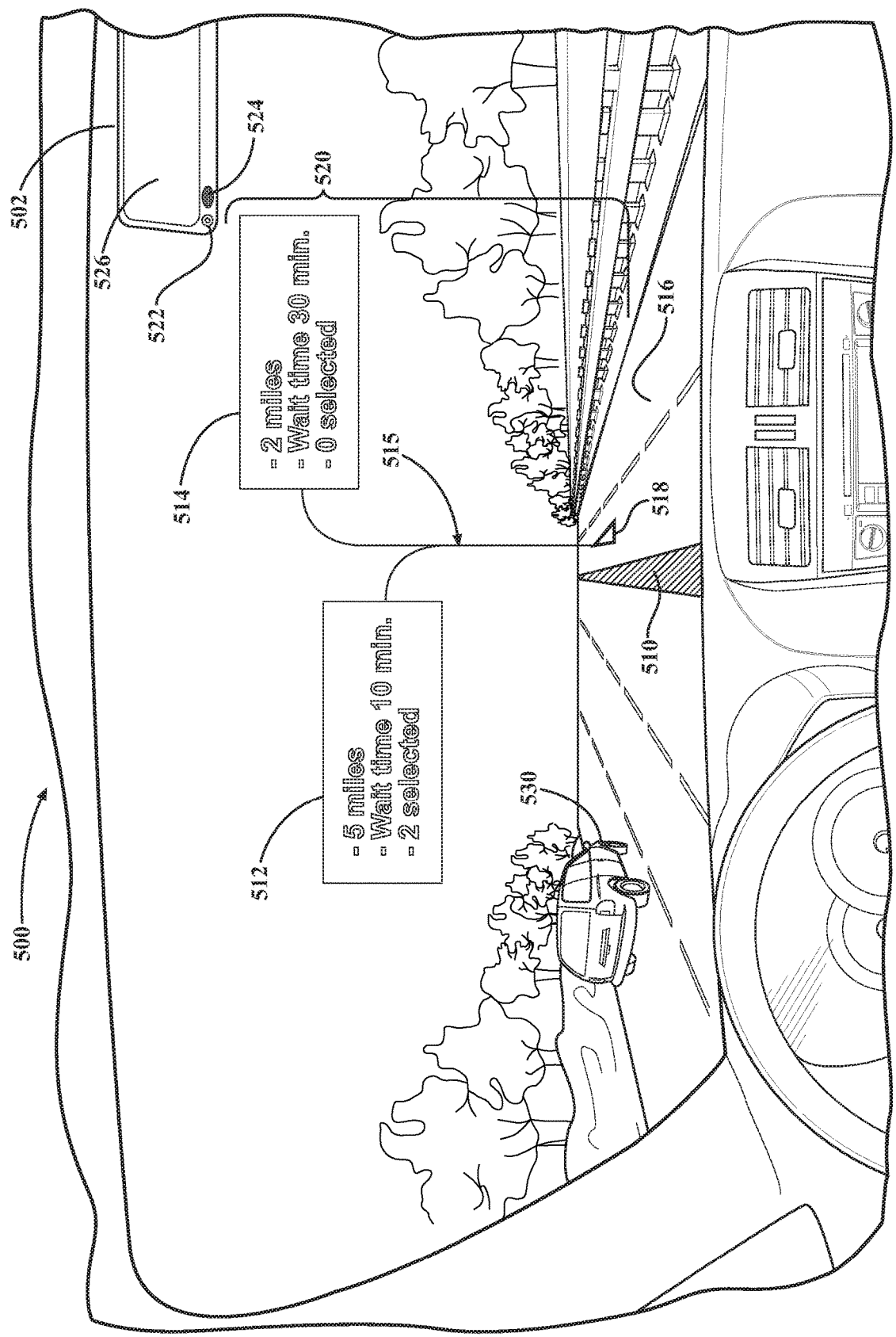
FIG. 5 depicts a recipient vehicle with a selection of parking areas, according to embodiments described herein.

FIG. 5 depicts a recipient vehicle 500 with a selection of parking areas, according to embodiments described herein. The recipient vehicle 500 can be a vehicle with one or more systems and devices for receiving a selection of parking areas, and thus being capable of beneficially incorporating the embodiments described herein. In one embodiment, the recipient vehicle 500 is substantially similar to the vehicle 100, described with reference to FIG. 1. As shown here, the recipient vehicle 500 includes an augmented reality display 520. The augmented reality display 520 can be integrated into the windshield 502, as shown here. The recipient vehicle 500 can be in route to a location, such as by following a route 510 on a road 516. There can be one or more sensors in the recipient vehicle 500, such as a camera 522 and a microphone 524, shown here as integrated into a rear view mirror 526. The sensors shown here can be part of a system, such as the sensor system 120 described with reference to the vehicle 100 in FIG. 1.

FIG. 5 can be viewed as a continuation of the description in FIGS. 4A and 4B, using the operator activity information 360 and the idle information collected therein. In embodiments described herein, the computing device 200 can receive the information from the sensing vehicles 402, 404 and 412, including idle information. Further, the computing device 200 can collect similar information from other parking areas within a given region. In this way, the database 310 can includes idle times from a variety of sensing vehicles in the plurality of parking areas. The idle information can then be used to create an estimated wait time for each parking area, such as the parking area 400. The estimation module 340 can produce a selection of parking areas in the plurality of parking areas. The selection of parking areas can be based on operator selected criteria, such as destination, distance from the destination, maximum wait time, or other criteria. The selection of parking areas can be displayed using a communication device, such as the augmented reality display 520. Shown here, the selection of parking areas includes a parking area 512 and a parking area 514, depicted on the augmented reality display 520 from the current location 518. The depiction of the parking areas 512 and 514 can include a depiction of a driving route 515 to said parking area.

The operator can then, using the augmented reality display 520, select a parking area from the selection of parking areas. The selection of the parking area can be made by a voice command, such as by using natural language speech through the microphone 524. In another embodiment, the selection can be made using a gesture, as determined by the camera 522. In further embodiments, the selection can be made autonomously using an autonomous system, such as the estimation module 340. In one embodiment, the operator can provide one or more criteria to the estimation module 340. The estimation module 340 can then apply the provided criteria to determine the desired parking area.

The selection of the parking area, such as between parking area 512 and 514, can be dependent on the number of other recipient vehicles which have selected said parking area. In embodiments described herein, the selection of a parking area can be considered in the estimated wait time or the selection can be provided as a separate criteria. In one example, the estimation module 340 receives input from one or more secondary recipient vehicles, such as secondary recipient vehicle 530. The estimation module 340 understands that the secondary recipient vehicle 530 can increase the estimated wait time for the recipient vehicle 500. This information can be incorporated into the displayed wait time. In a further embodiment, the information regarding the secondary recipient vehicle 530 can be displayed with the selected parking area. In this embodiment, "2 selected" is shown under parking area 512 in the augmented reality display 520, indicating that the parking area 512 has been selected by two (2) other recipient vehicles. In this example, the recipient vehicle 500 then chooses the parking area 512 based on estimated wait time. Once the selection is made, the recipient vehicle 500 can continue toward the selected parking area 512. The recipient vehicle 500 can be controlled locally, using manual, semi-autonomous or autonomous control. In another embodiment, the estimation module 340 can provide instructions to the autonomous driving module for continuing to the selected parking area 512.

Figure 6:
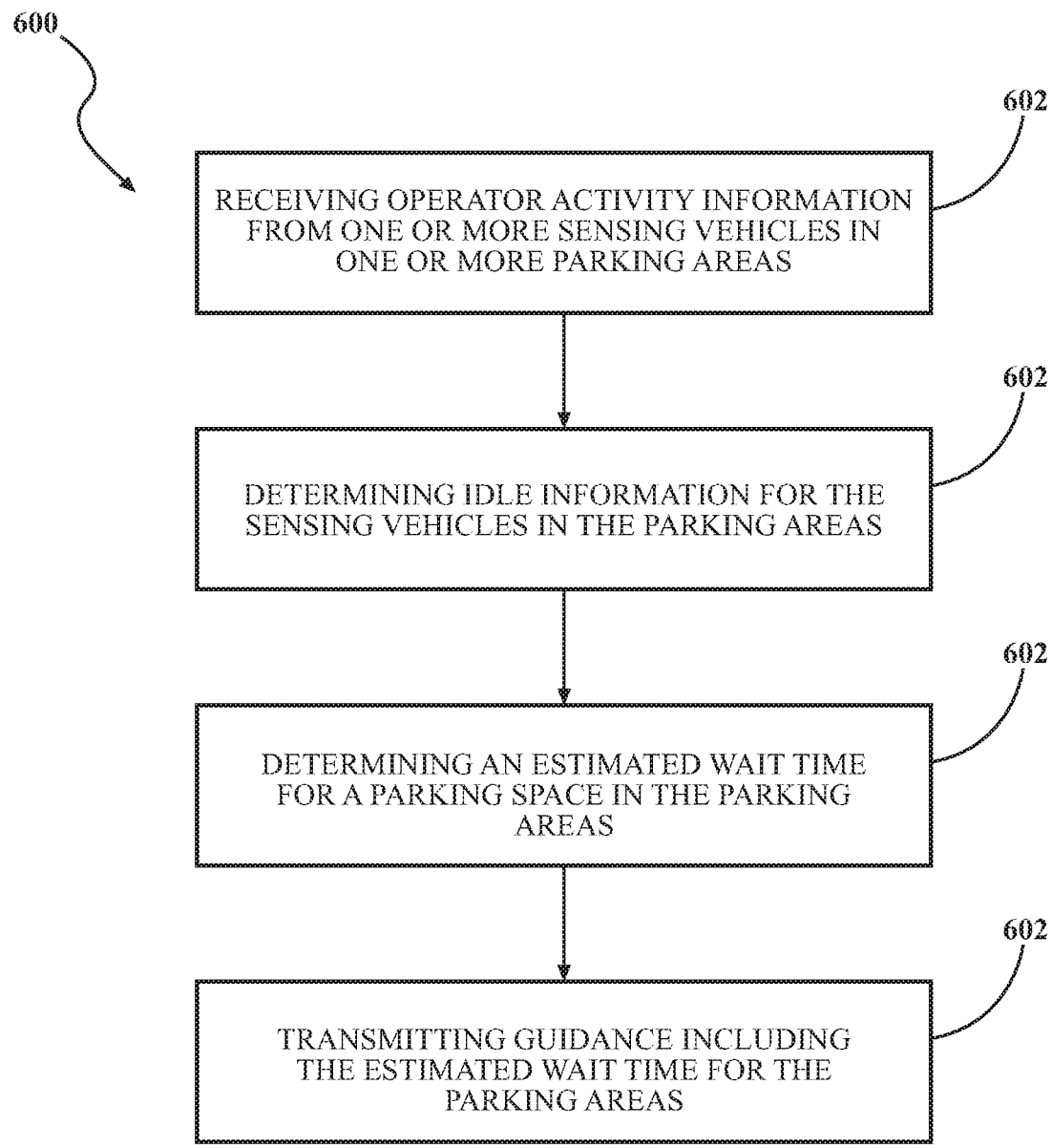
FIG. 6 is a flow diagram of a method for predicting wait time in a parking area, according to one or more embodiments.

FIG. 6 is a flow diagram of a method for predicting wait time in a parking area, according to one or more embodiments. The method includes determining how long a sensing vehicle has been within a parking area without parking. Using this information, the method determines the estimated wait time for the parking area and transmits guidance to one or more recipient vehicles. Thus, the method 600 helps with, for example, efficient selection of parking areas, saving gas and preventing congestion on roadways. The method 600 includes receiving operator activity information from one or more sensing vehicles in one or more parking areas, at 602. Then, using the operator activity information, idle information can be determined for the sensing vehicles in the parking areas, at 604. Then, using the idle information, the estimated wait time can be determined for a parking space in the parking area, at 606. Parking area guidance including the estimated wait time can then be transmitted to a recipient vehicle, at 608.

The method 600 includes receiving operator activity information from one or more sensing vehicles in one or more parking areas, at 602. The sensing vehicles can be in communication with a network and/or one or more computing devices. The sensing vehicles can transmit information regarding their coordinates upon request, upon entering a specified region or at specific time intervals. The sensing vehicles can provide locational information to the computing devices. In one or more embodiments, the detection of the sensing vehicles can be included as part of a system, such as the parking interval system 270 described with reference to FIG. 3. The parking interval system 270 can be included as part of a computing device 200 and in communication with a network 380. In one embodiment, a proximity module 320 can including instructions to detect one or more sensing vehicles in the boundaries of the plurality of parking areas.

The sensing vehicles can include one or more sensors, such as those described with reference to the sensor systems 120 of the vehicle 100 at FIG. 1. The sensors can provide operator activity information, which includes information related to the movement or position of the sensing vehicle in the parking area. The operator activity information can be collected from one or more sensing vehicles in the plurality of parking areas. Further, the operator activity information can be collected over a period of time, as described above. In one or more embodiments, the operator activity information can be received from the sensing vehicles as part of a system, such as the parking interval system 270 described with reference to FIG. 3. The parking interval system 270 can be included as part of the computing device 200 and in communication with the network 380. In one embodiment, the proximity module 320 of the parking interval system 270 can including instructions to receive operator activity information from the one or more sensing vehicles. The operator activity information can include changes in movement or position within the parking area, while the one or more sensing vehicles are active and not parked.

Then, using the operator activity information, idle information can be determined for the sensing vehicles in the parking areas, at 604. The idle information is determined based on the operator activity information. The idle information is a determination of whether the vehicle is parked or not, within the parking area. The operator activity information provides facts and details regarding the behavior of the vehicle. The idle information can be determined with comparison to a vehicle activity model, such as the vehicle activity model 370, described with reference to FIG. 3. The vehicle activity model can include analysis data for determining whether a sensing vehicle is parked or not, based on the operator activity information. In one embodiment, the idle information is substantially similar to the idle information as described with reference to FIGS. 3 and 4. In one or more embodiments, the idle information can be determined from the operator activity information as part of a system, such as the parking interval system 270 described with reference to FIG. 3. In one embodiment, the activity monitoring module 330 of the parking interval system 270 can including instructions to determine, using the operator activity information, idle information for the one or more sensing vehicles in the plurality of parking areas. The idle information can indicate the parking status of the one or more sensing vehicles.

Then, using the idle information, the estimated wait time can be determined for a parking space in the parking area, at 606. The estimated wait time is the time period that a vehicle is expected to wait for a parking space. The estimated wait time can be restricted to one or more time frames, as described above with reference to FIG. 3. The estimated wait time can be given for a variety of parking areas. Further, the estimated wait time can be determined for a specific region or sub-region (e.g., a city/town or a portion of a city/town). In one embodiment, the estimated wait time is substantially similar to the estimated wait time described above, with reference to FIGS. 3 and 4. In one or more embodiments, the estimated wait time can be determined as part of a system, such as the parking interval system 270 described with reference to FIG. 3. In one embodiment, the activity monitoring module 330 of the parking interval system 270 can including instructions to determine, using the operator activity information, idle information for the one or more sensing vehicles in the plurality of parking areas. The idle information can indicate the parking status of the one or more sensing vehicles.

Parking area guidance including the estimated wait time can then be transmitted to a recipient vehicle, at 608. The parking area guidance can be delivered to a recipient vehicle to assist in the choice of a parking area. The guidance can be provided as determined by one or more inputs from an operator. The inputs from the operator can select the parking area or they can be used to set the parameters for autonomous selection of the parking area. In one embodiment, the guidance is substantially similar to the guidance described with reference to FIGS. 3 and 4. In one or more embodiments, the estimated wait time can be determined as part of a system, such as the parking interval system 270 described with reference to FIG. 3. In one embodiment, the activity monitoring module 330 of the parking interval system 270 can including instructions to determine, using the operator activity information, idle information for the one or more sensing vehicles in the plurality of parking areas. The idle information can indicate the parking status of the one or more sensing vehicles.

Other and further embodiments of the methods and systems described above are contemplated, including combinations of or deletions from said methods, without specific recitation thereof. In one embodiment, the idle information indicates the parking status of the one or more sensing vehicles. In another embodiment, the estimation module further comprises instructions to control the recipient vehicle, wherein the recipient vehicle provides a selected parking area from the selection of parking areas. In another embodiment, the estimation module further comprises instructions to monitor a plurality of recipient vehicles with relation to the selected parking area and provide guidance related to the movement of the plurality of recipient vehicles. In another embodiment, the idle information is determined using a vehicle activity model. In another embodiment, the estimation module further comprises instructions to generate a probability map, the probability map indicating the relative distance of the plurality of parking areas and the estimated wait times of said parking areas. In another embodiment, the estimated wait time is related to specific intervals over the course of a day, days of the week, weeks or months of the year, holidays, events, or combinations thereof. In another embodiment, the operator activity information is collected while the one or more sensing vehicle is in a movement area.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous driving module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger) or from external systems, such as from the parking interval system 270, described above with reference to FIG. 2. The vehicle 100 can include an output system 135. An "output system" includes any device, component, or arrangement or groups thereof that enable information/data to be transmitted to the vehicle or presented to a vehicle passenger (e.g. a person, a vehicle passenger, etc.). The output system 135 can be configured to communicate sensor data and other information to the parking interval system 270, as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the parking interval system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the parking interval system 170, and/or the autonomous driving module(s) 160 may control some or all of these vehicle systems 140 and, thus, may be partially or fully autonomous.

The processor(s) 110, the parking interval system 170, and/or the autonomous driving module(s) 160 can be operably connected to communicate with the various vehicle systems 140 and/or individual components thereof. For example, returning to FIG. 1, the processor(s) 110, the parking interval system 170, and/or the autonomous driving module(s) 160 can be in communication to send and/or receive information from the various vehicle systems 140 to control the movement, speed, maneuvering, heading, direction, etc. of the vehicle 100. The processor(s) 110, the parking interval system 170, and/or the autonomous driving module(s) 160 may control some or all of these vehicle systems 140.

The processor(s) 110, the parking interval system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the parking interval system 170, and/or the autonomous driving module(s) 160 can control the direction and/or speed of the vehicle 100. The processor(s) 110, the parking interval system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the parking interval system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the parking interval system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience. The noted functions and methods will become more apparent with a further discussion of the figures.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A parking interval system for predicting wait time, comprising:
one or more processors; and
a memory communicably coupled to the one or more processors and storing instructions that when executed by the one or more processors cause the one or more processors to:
receive operator activity information from one or more sensing vehicles in one or more parking areas, the operator activity information including changes in movement or position within the one or more parking areas while the one or more sensing vehicles are active;
determine which of the one or more sensing vehicles are: idle and waiting on a parking spot, idle and not attempting to park, and already parked;
determine, using the operator activity information idle information for the one or more sensing vehicles in the one or more parking areas, the idle information including a period of time that the one or more sensing vehicles spend in the one or more parking areas without being parked, wherein being parked includes the or more sensing vehicles being located in a parking space of the one or more parking areas and an ignition of the one or more sensing vehicles is turned off;
determine, using the idle information, with respect to the one or more sensing vehicles which are idle and waiting on a parking spot, an estimated wait time for a parking space in the one or more parking areas; and
transmit, through a communication device to a recipient vehicle, guidance including the estimated wait time for the one or more parking areas, whereby the guidance is used by the recipient vehicle or an occupant of the recipient vehicle to assist in a choice of a parking spot.

2. The parking interval system of claim 1, wherein the idle information indicates a parking status of the one or more sensing vehicles.

3. The parking interval system of claim 1, wherein the memory stores further instructions that when executed by the one or more processors cause the one or more processors to:
control the recipient vehicle, wherein the recipient vehicle provides a selected parking area from a selection of parking areas, the selection of parking areas being selected from the one or more parking areas based on the estimated wait time.

4. The parking interval system of claim 3, wherein the memory stores further instructions that when executed by the one or more processors cause the one or more processors to:
monitor the recipient vehicle and one or more other recipient vehicles with relation to the selected parking area; and
provide the guidance related to selection of a selected parking area by the recipient vehicle and the one or more other recipient vehicles.

5. The parking interval system of claim 1, wherein the idle information is determined using a vehicle activity model.

6. The parking interval system of claim 1, wherein the memory stores further instructions that when executed by the one or more processors cause the one or more processors to:
generate a probability map, the probability map indicating a relative distance of the one or more parking areas and the estimated wait time of said parking areas.

7. The parking interval system of claim 1, wherein the estimated wait time is related to specific intervals over the course of a day, days of a week, weeks or months of a year, holidays, events, or combinations thereof.

8. The parking interval system of claim 1, wherein the operator activity information is collected while the one or more sensing vehicles is in a movement area.

9. A non-transitory computer-readable medium for predicting wait time and storing instructions that when executed by one or more processors cause the one or more processors to:
receive operator activity information from one or more sensing vehicles in one or more parking areas, the operator activity information including changes in movement or position within the one or more parking areas while the one or more sensing vehicles are active;
determine which of the one or more sensing vehicles are: idle and waiting on a parking spot, idle and not attempting to park, and already parked;
determine, using the operator activity information with respect to the one or more sensing vehicles which are idle and waiting on a parking spot, idle information for the one or more sensing vehicles in the one or more parking areas, the idle information including a period of time that the one or more sensing vehicles spend in the one or more parking areas without being parked, wherein being parked includes the or more sensing vehicles being located in a parking space of the one or more parking areas and an ignition of the one or more sensing vehicles is turned off;
determine, using the idle information, an estimated wait time for a parking space in the one or more parking areas; and
transmit, through a communication device to a recipient vehicle, guidance including the estimated wait time for the one or more parking areas, whereby the guidance is used by the recipient vehicle or an occupant of the recipient vehicle to assist in a choice of a parking spot.

10. The non-transitory computer-readable medium of claim 9, wherein the idle information indicates a parking status of the one or more sensing vehicles.

11. The non-transitory computer-readable medium of claim 9, further comprising instructions to control the recipient vehicle, wherein the recipient vehicle provides a selected parking area from the one or more of parking areas.

12. The non-transitory computer-readable medium of claim 11, further comprising instructions to monitor a plurality of recipient vehicles with relation to the selected parking area and provide guidance related to a selection of the selected parking area by the plurality of recipient vehicles.

13. The non-transitory computer-readable medium of claim 9, wherein the idle information is determined using a vehicle activity model.

14. The non-transitory computer-readable medium of claim 9, further comprising instructions to generate a probability map, the probability map indicating a relative distance of one or more parking areas and the estimated wait time of said parking areas.

15. The non-transitory computer-readable medium of claim 9, wherein the estimated wait time is related to specific intervals over the course of a day, days of a week, weeks or months of a year, holidays, events, or combinations thereof.

16. A method for predicting wait time, comprising:
  receiving operator activity information from one or more sensing vehicles in one or more parking areas, the operator activity information including changes in movement or position within the one or more parking areas while the one or more sensing vehicles are active;
  determine which of the one or more sensing vehicles are: idle and waiting on a parking spot, idle and not attempting to park, and already parked;
  determining, using the operator activity information with respect to the one or more sensing vehicles which are idle and waiting on a parking spot, idle information for the one or more sensing vehicles in the one or more parking areas, the idle information including a period of time that the one or more sensing vehicles spend in the one or more parking areas without being parked, wherein being parked includes the or more sensing vehicles being located in a parking space of the one or more parking areas and an ignition of the one or more sensing vehicles is turned off;
  determining, using the idle information, an estimated wait time for a parking space in the one or more parking areas; and
  transmitting, through a communication device to a recipient vehicle, guidance including the estimated wait time for the one or more parking areas, whereby the guidance is used by the recipient vehicle or an occupant of the recipient vehicle to assist in a choice of a parking spot.

17. The method of claim 16, further comprising controlling the recipient vehicle, wherein the recipient vehicle provides a selected parking area from the one or more parking areas.

18. The method of claim 17, further comprising a plurality of recipient vehicles, monitoring the plurality of recipient vehicles with relation to the selected parking area, and providing guidance related to a selection of the selected parking area by the plurality of recipient vehicles.

19. The method of claim 16, wherein the idle information is determined using a vehicle activity model.

20. The method of claim 16, further comprising generating a probability map, the probability map indicating a relative distance of one or more parking areas and the estimated wait times of said parking areas.

* * * * *